(12) United States Patent
Paiam et al.

(10) Patent No.: US 6,339,474 B2
(45) Date of Patent: Jan. 15, 2002

(54) INTERFEROMETRIC OPTICAL DEVICE INCLUDING AN OPTICAL RESONATOR

(75) Inventors: Reza Paiam, Ottawa (CA); Nigel Copner, Fremont, CA (US); Barrie Keyworth, Stittsville (CA)

(73) Assignee: JDS Uniphase Inc. (CA)

( * ) Notice: Subject to any disclaimer, the term of this patent is extended or adjusted under 35 U.S.C. 154(b) by 0 days.

(21) Appl. No.: 09/871,822

(22) Filed: Jun. 4, 2001

Related U.S. Application Data

(60) Division of application No. 09/358,445, filed on Jul. 22, 1999, now Pat. No. 6,281,977, which is a continuation-in-part of application No. 09/338,925, filed on Jun. 23, 1999, now abandoned, which is a continuation-in-part of application No. 09/275,962, filed on Mar. 25, 1999, now Pat. No. 6,125,220.

(30) Foreign Application Priority Data

Dec. 23, 1998 (CA) .............................................. 2256963

(51) Int. Cl.⁷ ................................................ G01B 9/02
(52) U.S. Cl. ........................ 356/480; 359/577; 385/27
(58) Field of Search ................................ 356/480, 477; 359/577; 385/27, 31, 39, 42

(56) References Cited

U.S. PATENT DOCUMENTS 6,125,220 A * 9/2000 Copner et al. ................. 385/27
6,222,958 B1 * 4/2001 Paiam ........................... 385/27
6,281,977 B1 * 8/2001 Paiam et al. .................. 356/480

OTHER PUBLICATIONS

"Multifunction optical filter with a Michelson–Gires–Tournois interferometer for wavelength–division–multiplexed network system applications," Optical Society of America, 1998, 3 pp. Benjamin B. Dingel and Masayuki Izutsu.

* cited by examiner

Primary Examiner—Samuel A. Turner
(74) Attorney, Agent, or Firm—Hall, Priddy, Myers & Vande Sande

(57) ABSTRACT

A method and circuit is disclosed wherein two waveguides coupled to an optical resonator are further coupled such that beams propagating therein interfere with one another to provide a desired output response. In one embodiment, multiplexed channels of light can be demultiplexed by the device described heretofore, or alternatively, the phase relationship between these two beams can be altered prior to their being combined to provide, for example, a linearized output response useful in applications such as wavelength locking.

17 Claims, 18 Drawing Sheets

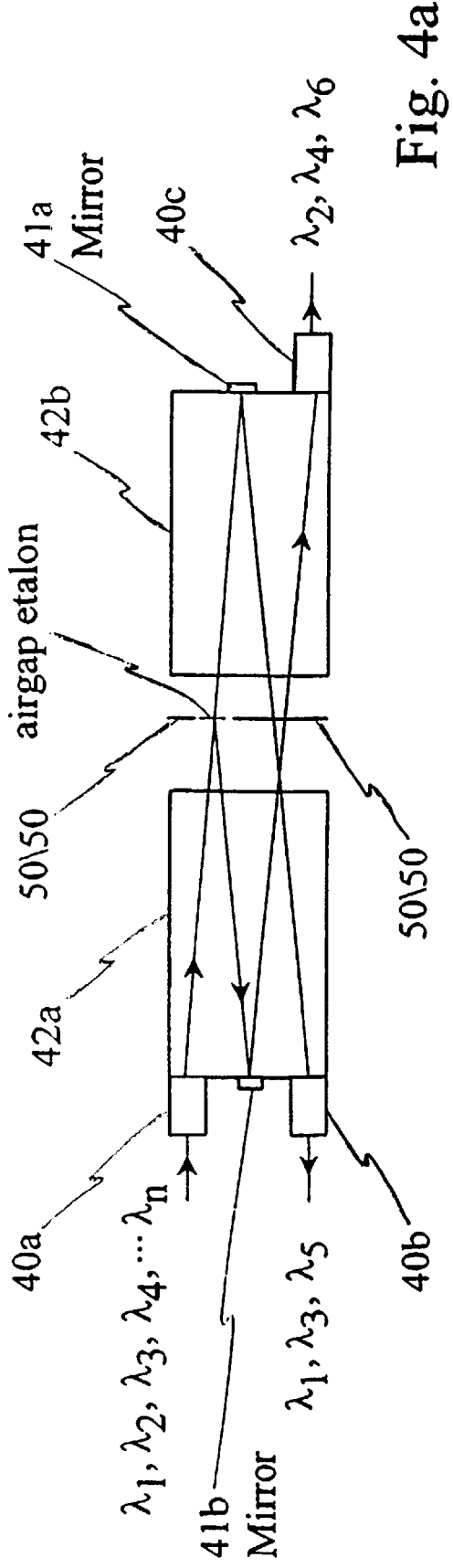
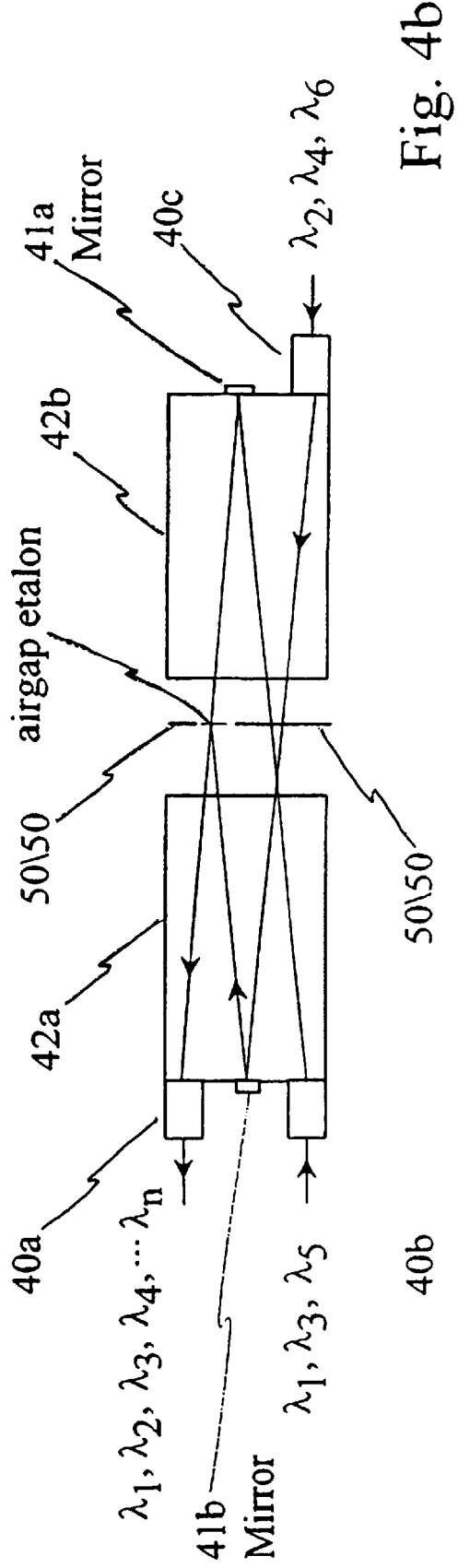
Fig. 4a
Fig. 4b or

INTERFEROMETRIC OPTICAL DEVICE INCLUDING AN OPTICAL RESONATOR

This application is a divisional of application Ser. No. 09/358,445 filed Jul. 22, 1999, now U.S. Pat. No. 6,281,977, entitled Interferometric Optical Device Including an Optical Resonator, which is a continuation-in-part of application Ser. No. 09/338,925 filed Jun. 23, 1999, now abandoned, entitled Interferometric Optical Device Including a Resonant Optical Cavity, which is a Continuation-in-Part of application Ser. No. 09/275,962 filed Mar. 25, 1999, now U.S. Pat. No. 6,125,220, entitled Interferometric Optical Device Including a Resonant Optical Cavity.

FIELD OF THE INVENTION

This invention relates to generally to a multi-port optical cavity and more particularly to an optical cavity having at least three-ports and use thereof.

BACKGROUND OF THE INVENTION

Using optical signals as a means of carrying channeled information at high speeds through an optical path such as an optical waveguide i.e. optical fibres, is preferable over other schemes such as those using microwave links, coaxial cables, and twisted copper wires, since in the former, propagation loss is lower, and optical systems are immune to Electro-Magnetic Interference (EMI), and have higher channel capacities. High-speed optical systems have signaling rates of several mega-bits per second to several tens of giga-bits per second.

Optical communication systems are nearly ubiquitous in communication networks. The expression herein "Optical communication system" relates to any system that uses optical signals at any wavelength to convey information between two points through any optical path. Optical communication systems are described for example, in Gower, Ed. Optical communication Systems, (Prentice Hall, N.Y.) 1993, and by P.E. Green, Jr in "Fiber optic networks" (Prentice Hall N.J.) 1993, which are incorporated herein by reference.

As communication capacity is further increased to transmit an ever-increasing amount of information on optical fibres, data transmission rates increase and available bandwidth becomes a scarce resource.

High speed data signals are plural signals that are formed by the aggregation (or multiplexing) of several data streams to share a transmission medium for transmitting data to a distant location. Wavelength Division Multiplexing (WDM) is commonly used in optical communications systems as means to more efficiently use available resources. In WDM each high-speed data channel transmits its information at a pre-allocated wavelength on a single optical waveguide. At a receiver end, channels of different wavelengths are generally separated by narrow band filters and then detected or used for further processing. In practice, the number of channels that can be carried by a single optical waveguide in a WDM system is limited by crosstalk, narrow operating bandwidth of optical amplifiers and/or optical fiber non-linearities. Moreover such systems require an accurate band selection, stable tunable lasers or filters, and spectral purity that increase the cost of WDM systems and add to their complexity. This invention relates to a method and system for filtering or separating closely spaced channels that would otherwise not be suitably filtered by conventional optical filters.

Currently, internationally agreed upon channel spacing for high-speed optical transmission systems, is 100 Ghz, equivalent to 0.8 nm, surpassing, for example 200 Ghz channel spacing equivalent to 1.6 nanometers between adjacent channels. Of course, as the separation in wavelength between adjacent channels decreases, the requirement for more precise demultiplexing circuitry capable of ultra-narrow-band filtering, absent crosstalk, increases. The use of conventional dichroic filters to separate channels spaced by 0.4 nm or less without crosstalk, is not practicable; such filters being difficult if not impossible to manufacture.

In a paper entitled Multifunction optical filter with a Michelson-Gires-Turnois interferometer for wavelength-division-multiplexed network system applications, by Benjamin B. Dingle and Masayuki Izutsu published 1998, by the Optical Society of America, a device hereafter termed the GT device provides some of the functionality provided by the instant invention. For example, the GT device as exemplified in FIG. 1 serves as a narrow band wavelength demultiplexor; this device relies on interfering a reflected E-field with an E-field reflected by a plane mirror 16. The etalon 10 used has a 99.9% reflective back reflector 12r and a front reflector 12f having a reflectivity of about 10%; hence an output signal from only the front reflector 12f is utilized. A beam splitting prism (BSP) 18 is disposed to receive an incident beam and to direct the incident beam to the etalon 10. The BSP 18 further receives light returning from the etalon and provides a portion of that light to the plane mirror 16 and a remaining portion to an output port. Although this known GT device appears to perform its intended function, it appears to have certain limitations: As opposed to the device of the instant invention which has a phase difference between transmitted and reflected E-fields of 0 and $\pi$ radians, the GT as can be seen in the graph of FIG. 1b has some variation in phase between 0 and $\pi$ radians. Furthermore, in the GT device a finite optical path difference is required in the interferometer to produce an output response that mimics the one provided by the device of the instant invention. Typically for a 50 GHz free spectral range (FSR) this optical path difference would be a few millimeters; in contrast in the instant invention the optical phase difference need only be approximately $\lambda/4$ resulting in a more temperature stable and insensitive system. One further limitation of the GT device is its apparent requirement in the stabilization of both the etalon and the interferometer. Yet a further drawback to the GT device is the requirement for an optical circulator to extract the output signal adding to signals loss and increased cost of the device; and the requirement of a BSP which is known to have a significant polarization dependent loss. FIG. 1a shows a graph with a linear plot of the phase difference between the two reflected E-fields from the GT and a mirror with an optical path difference. Further, the graph shows a linear plot of phase variation of reflected light from the GT. A reflection profile is also shown in a logarithmic plot, and a straight sloped dotted line is a linear plot of a GT with a finite optical path difference.

It is an object of this invention to provide a method and circuit for separating an optical signal having closely spaced channels into at least two optical signals wherein channel spacing between adjacent channels is greater in each of the at least two optical signals, thereby requiring less precise filters to demultiplex channels carried by each of the at least two signals.

The present invention is believed to overcome many of the limitations of the prior art GT device and of other known multiplexing and demultiplexing devices.

It is an object of this invention to provide a relatively inexpensive optical circuit for interleaving or de-interleaving optical channels.

It is an object of this invention to provide an etalon based device wherein output signals from two oppositely disposed ports can be controllably interferometrically combined to yield a desired output response.

SUMMARY OF THE INVENTION

In accordance with the invention, a filtering device is provided comprising an optical resonator having a first and a second waveguide coupled thereto, one of the first and the second waveguides having an end for receiving an input signal to be filtered, the first and the second waveguide being optically coupled with the optical resonator at a first and second location respectively, for allowing light to couple into the resonator from one or more of the waveguides and or into one or more of the waveguides from the resonator; an optical coupler for coupling light within the two waveguides between said waveguides, the coupler being at a location along the waveguides such that output ends of the waveguides provide a filtering of said input light.

In accordance with the invention, there is further provided a filtering device comprising an optical ring resonator having a first and a second waveguide coupled thereto, one of the first and the second waveguides having an end for receiving an input signal to be filtered, the first and the second waveguide being optically coupled with the optical resonator at a first and second location respectively, for allowing light to couple into the ring resonator from one or more of the waveguides and or into one or more of the waveguides from the resonator; a 50:50 optical coupler for coupling light within the two waveguides between said waveguides, the coupler being at a location along the waveguides such that output ends of the waveguides provide a filtering of said input light.

BRIEF DESCRIPTION OF THE DRAWINGS

Exemplary embodiments of the invention will now be described in conjunction with the drawings in which:

FIG. 4a is a circuit block diagram of an alternative embodiment of the structure shown in FIG. 2, wherein two light transmissive blocks are utilized as combining regions;

FIG. 4b is a circuit block diagram similar to the one shown in FIG. 4a, wherein the circuit is operated in a reverse mode of operation;

DETAILED DESCRIPTION

In general, the spectral characteristics of an etalon filter are determined by the reflectivity and gap spacing of the mirrors or reflective surfaces. The Fabry-Perôt principle allows a wideband optical beam to be filtered whereby only periodic spectral passbands are substantially transmitted out of the filter. Conversely, if the reflectivity of the mirrors or reflective surfaces are selected appropriately, periodic spectral passbands shifted by d nanometers are substantially reflected backwards from the input mirror surface. In adjustable Fabry-Perôt devices, such as one disclosed in U.S. Pat. No. 5,283,845 in the name of Ip, assigned to JDS Fitel Inc, tuning of the center wavelength of the spectral passband is achieved typically by varying the effective cavity length (spacing).

Figure 1:
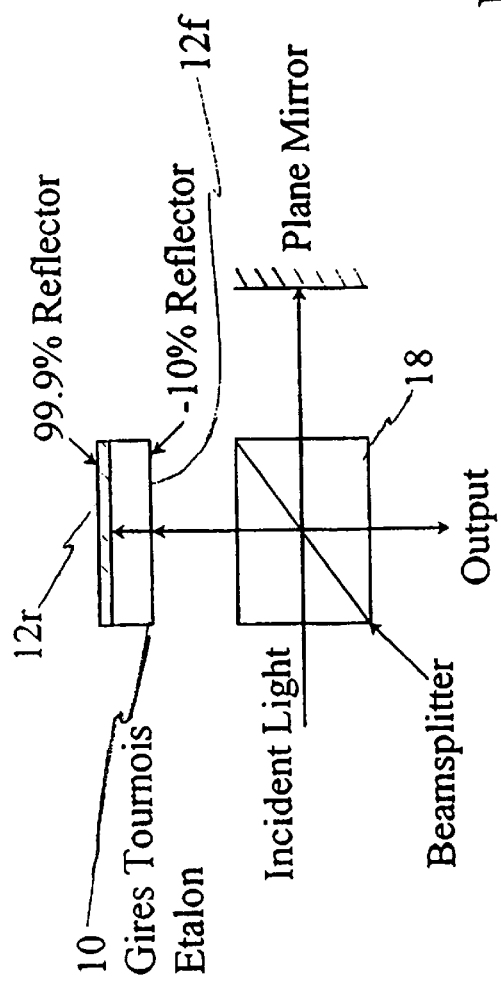
FIG. 1 is a circuit block diagram of a prior art Michelson-Gires-Tournois interferometer.
Figure 2A:
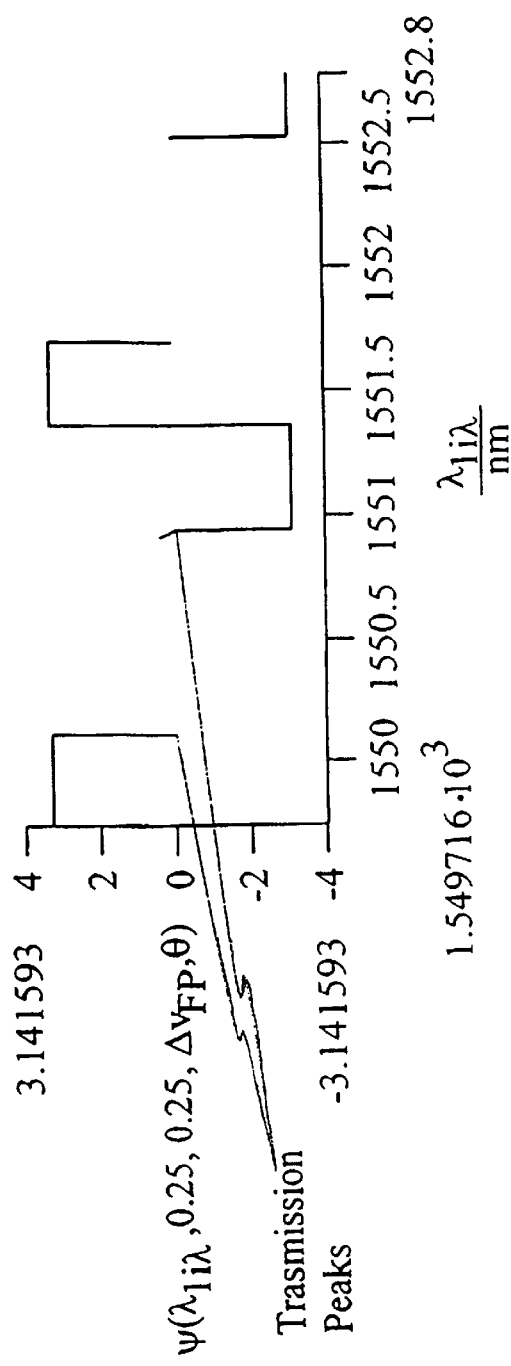
FIG. 2a is a graph plotting phase versus wavelength for a two output etalon in accordance with this invention.
Figure 1A:
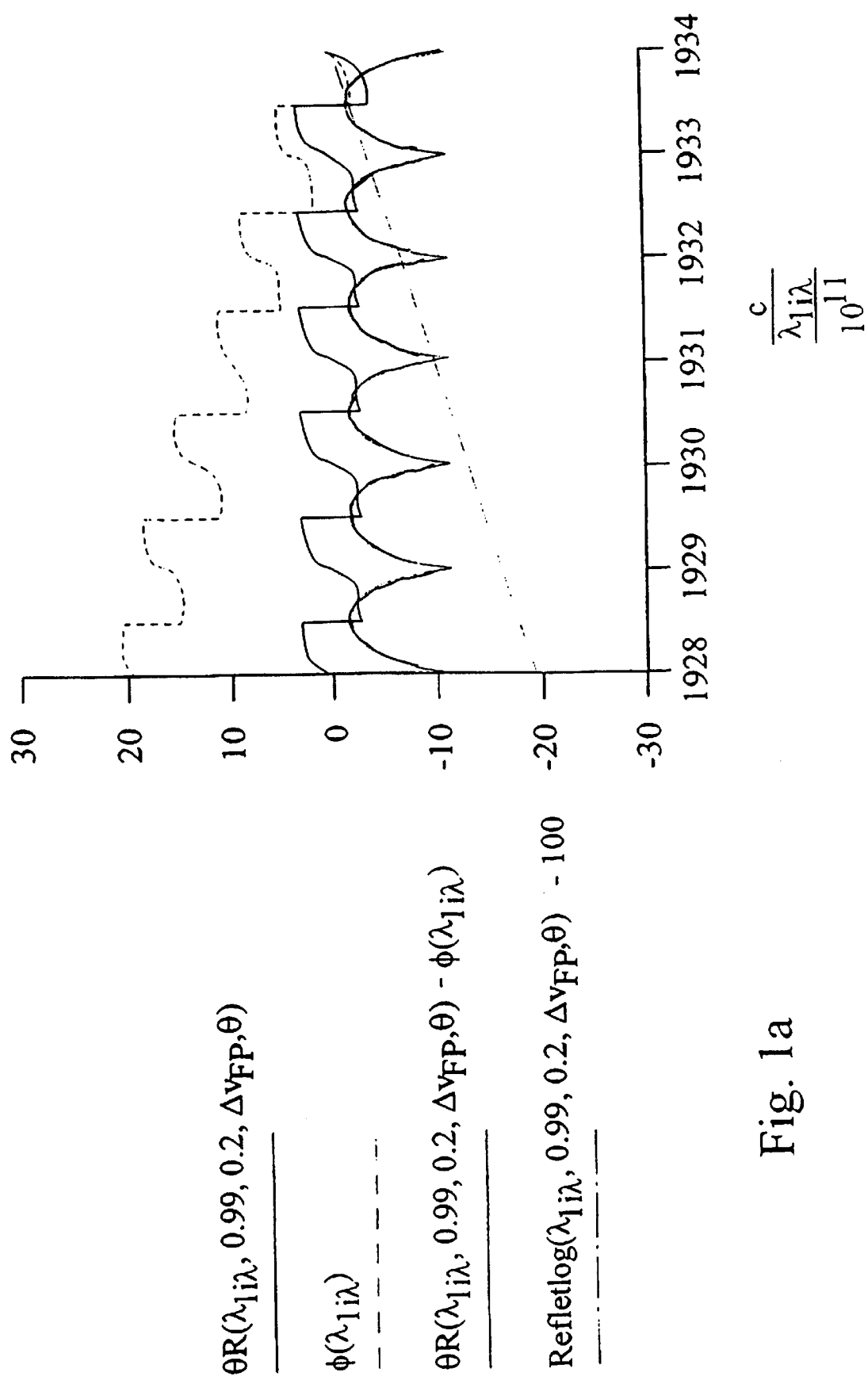
FIG. 1a is logarithmic graph plotting phase versus wavelength for a two output Michelson-Gires-Tournois interferometer.
Figure 1B:
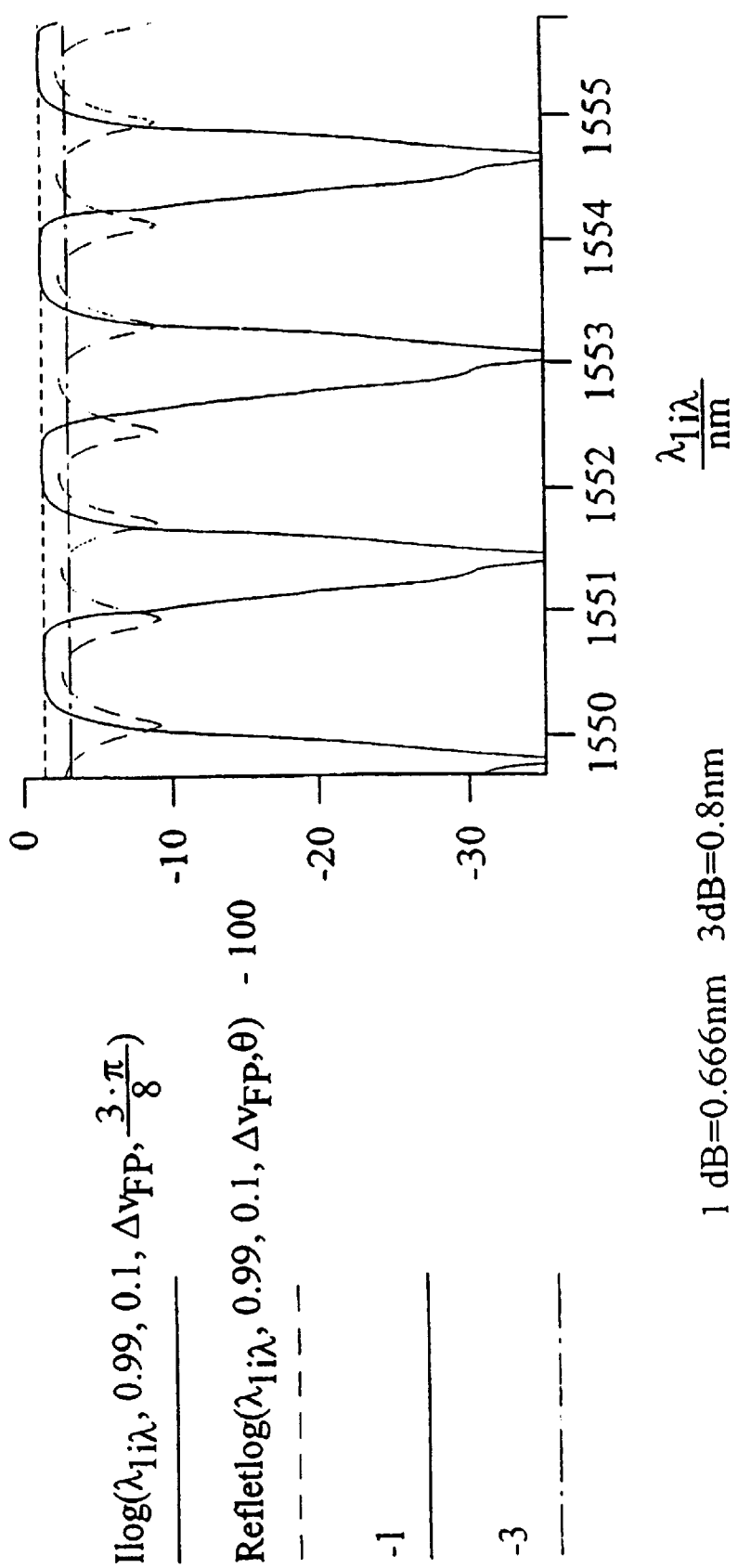
FIG. 1b is a graph of a simulated output response of a Michelson-Gires-Tournois interferometer.
Figure 2:
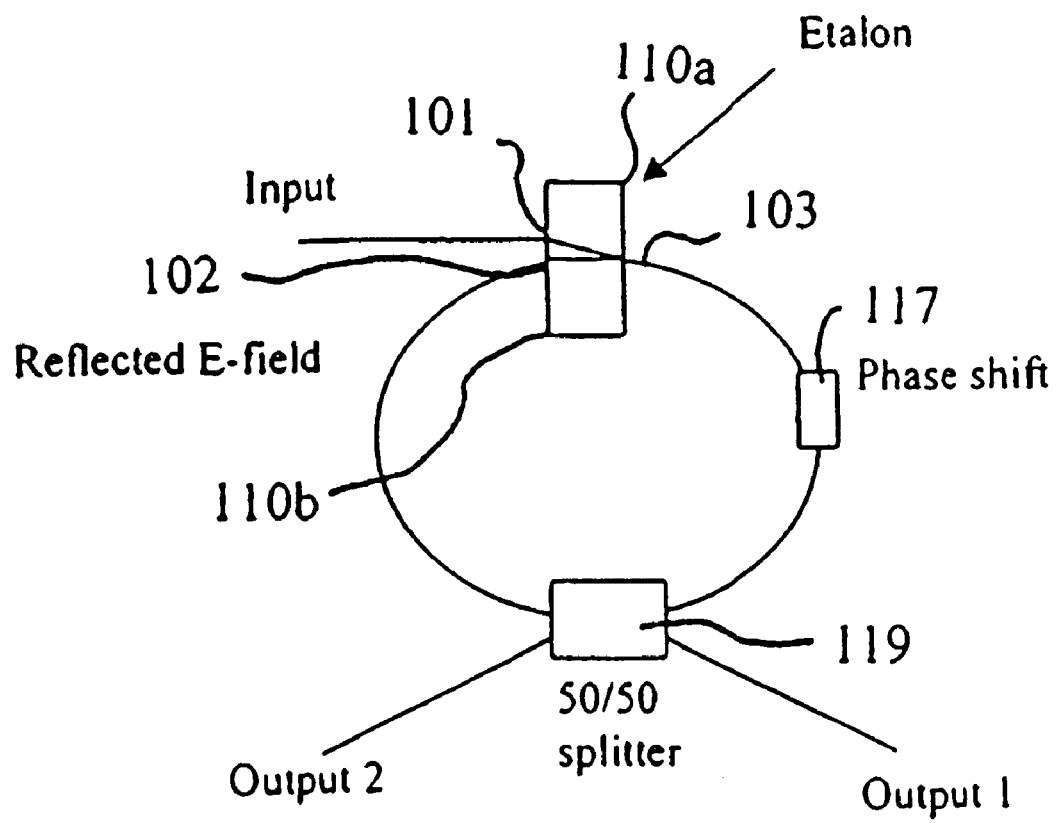
FIG. 2 is a circuit block diagram of a single etalon interferometric structure in accordance with the invention.

Referring now to FIG. 2, an optical circuit is shown for demultiplexing a channeled optical signal, that is, a signal comprising multiplexed closely spaced channels, into a plurality of less-dense channeled signals each comprising a plurality of multiplexed less closely spaced channels. Operating the circuit in a first direction wherein the circuit performs a multiplexing function on a plurality of channels launched into an end of the circuit, it is an interleaver circuit, and in an opposite direction wherein the circuit performs a demultiplexing function on a composite signal launched therein at an opposite end to provide a plurality of demultiplexed channels it serves as a de-interleaver circuit. However, the term interleaver circuit shall be used hereafter to denote this interleaver/deinterleaver circuit. One such interleaver circuit is disclosed as a comb splitting filter in U.S. Pat. No. 5,680,490 in the name of Cohen.

Figure 3:
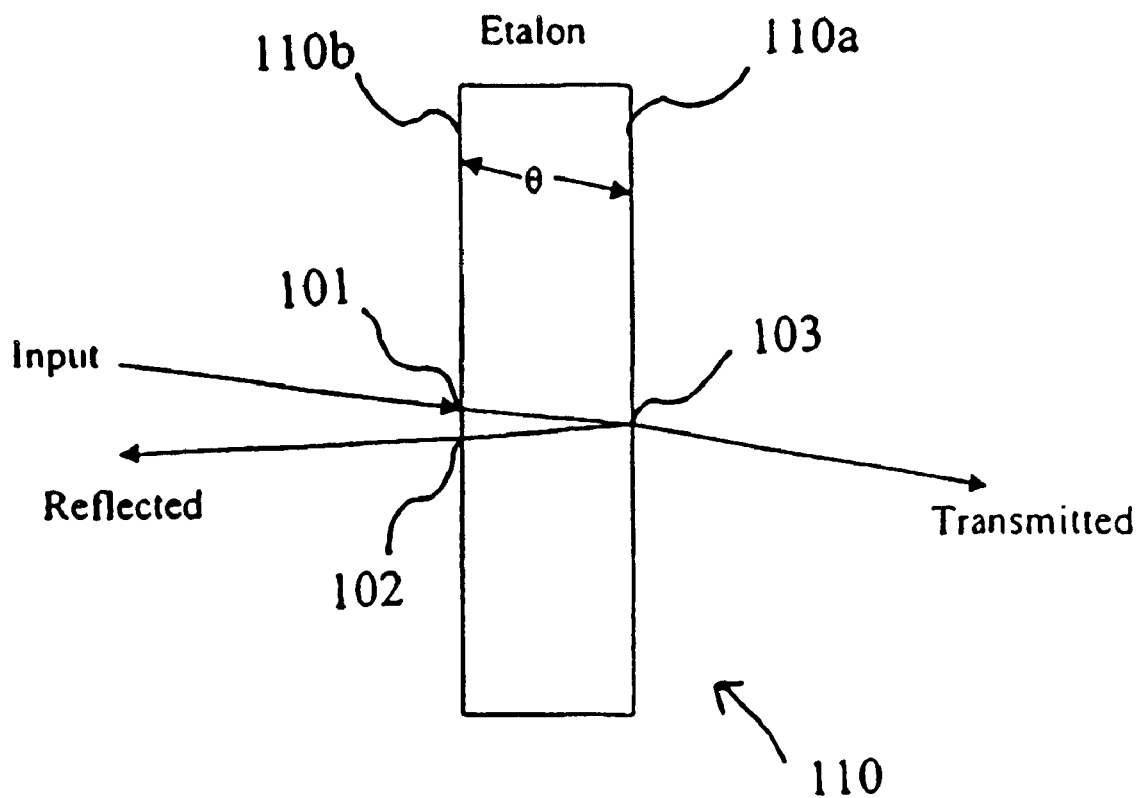
FIG. 3 is a more detailed diagram of the etalon shown in FIG. 2 in accordance with the invention.

Referring now to FIG. 2, an optical interleaver circuit is shown including a 3-port optical cavity in the form of a Fabry-Perôt etalon filter 110 (shown in more detail in FIG. 3) having a first partially reflective end face 110a and a second partially reflective end face 110b. The Fabry-Perôt etalon has an input port 101 at end face 110b, a second port 102 at the Fabry-Perôt etalon filter reflection end face 110, and a third port 103 coupled to a transmission end face 110a serving as an output port. The Fabry-Perôt etalon filter 110 has two partially reflective mirrors, or surfaces, facing each other and separated by a certain fixed gap which forms a cavity.

A phase shifter for controllably delaying an optical signal passing therethrough is optically coupled with the third port 103 at an end of the Fabry-Perôt etalon 110. A 50/50 splitter 119 is disposed between and optically coupled with an output end of the phase shifter 117 and the second port 102 of the Fabry-Perôt etalon 110. Although shown schematically as having waveguides, for example, optical fibres for directing signals from the etalon to the phase shifter 117 and splitter 119, less preferable free space implementations using mirrors or reflectors are within the capability of one skilled in the art. Of course coupling lenses (not shown) such as GRIN lenses are preferred for coupling light from and or to optical fibres from particular components.

The inventor has recently noticed that a phase difference between the reflected and transmitted E-field phase from an etalon, for example, the etalon 110, remains constant under certain circumstances. Furthermore, when input light is launched into the input port 101 of the etalon, the phase difference between a resulting signal exiting the end face 103 and a resulting signal exiting the end face 102 is either 0 or λ radians, and changes on every spectral transmission resonance. This is illustrated in FIG. 2a, where phase is plotted versus wavelength. The locking of the phase difference between transmitted and reflected E-fields occurs due to multiple interference effects within the etalon.

This invention utilizes this feature by interfering the two resulting signals, by way of example, so that a flat spectral passband filter can be realized. By adjusting the phase relationship between the two signals exiting opposing faces of the Fabry-Perôt etalon 110, and subsequently interfering these signals, various desired output responses can be realized. Of course, optionally, additional control can be added to either attenuate or amplify one of or both of the two signals. Since the path length difference between the optical fibres between port 2 of the etalon 110 and the 50/50 splitter 119 and between port 3 of the etalon 110 and the 50/50 splitter will likely be other than zero or some exact multiple of the free spectral range of the etalon, provision of the phase shifter 117 ensures a means of adjusting for unwanted or desired phase differences due to path length differences.

If no inherent phase difference is created between the two arms of the interferometer, that is, between the paths between the etalon 110 and the splitter 119, the following outputs will be obtained.

Output from port 3: $E_R e^{j\theta R}+E_T e^{j(\theta T-\pi/2)}$

Output from port 2: $E_T e^{j\theta T}+E_R e^{j(\theta R-\pi/2)}$

Where θR and θT are the reflected and transmitted phases created by the etalon. The interferometric output will be given by the general expression:

$I_{Res}=\frac{1}{2}(E_R^2+E_T^2+2E_R E_T COS(\Delta\theta))$

Where Δθ represents the phase difference between the two E-fields. If θR=θT then the phase difference for both outputs will be π/2. Also if θR−θT=π then again the phase difference for both the outputs would be π/2. Thus, the interferometric action that is desired does not exist.

However, π/2 phase difference is provided in the interferometric arms then the two outputs would be given by:

Output from port 3: $E_R e^{j\theta R}+E_T e^{j(\theta T)}$

Output from port 2: $E_T e^{j(\theta T+\pi/2)}+E_R e^{j(\theta R-\pi/2)}$

As can be seen from above the outputs from the interferometer now have a π phase shift, which indicates that useful or a desired interferometric action between the two signals can exist. The phase difference for the output at port 3 and the output at port 2 would be θR−θT and θR−θT−π respectively. If θR=θT then the phase difference for output the output at port 3 and 2 would be 0 and π respectively. For θR−θT=π then output at port 3 and 2 would have a phase difference of π and 0 respectively. Thus channel selection can be realized.

The circuit can operate as a de-interleaver filter, providing the separation of odd channels at one output of the splitter and even channels at a second output of the splitter.

By changing the phase relationship between the signals in the two arms of the circuit, being fed to the splitter, and by changing the reflectivities of the end faces of the etalon, for example to have 60% and 1% reflectivities, the interleaving function disappears and the circuit operates to provide a linearized output. Such a linearized output signal is useful in such applications as wavelength locking, where a linear ramped signal is desired. Furthermore, if the two output signals are subtracted from one another, the effect is further enhanced since no loss of the signal will be induced.

Figure 4C:
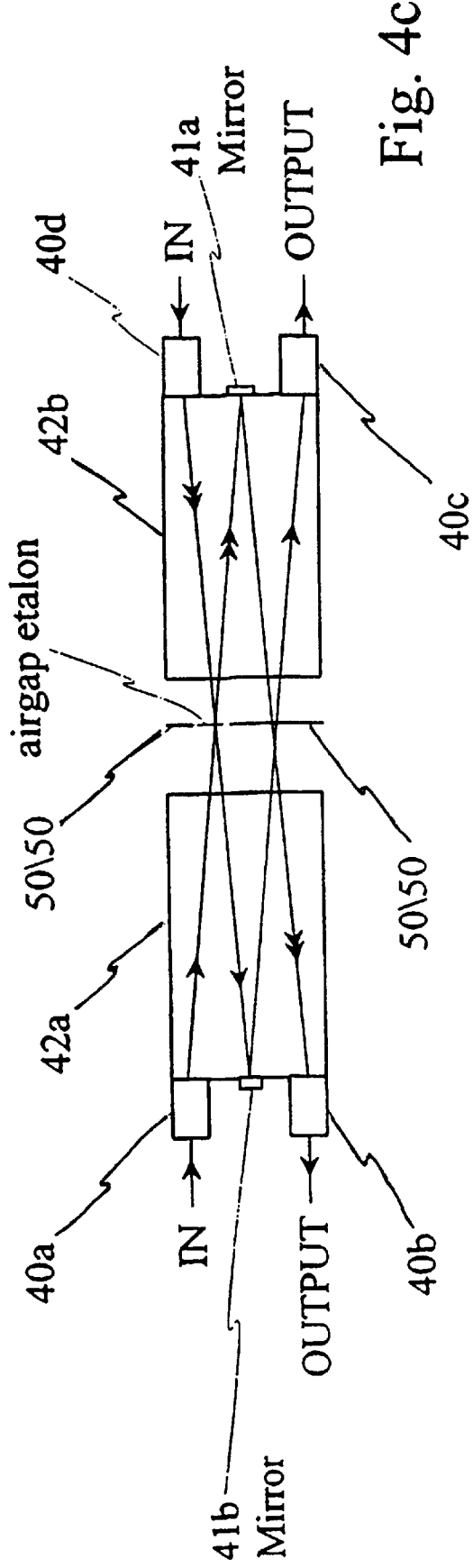
FIG. 4c is a similar circuit block diagram to FIGS. 4a and 4b, wherein a fourth port is added.
Figure 5:
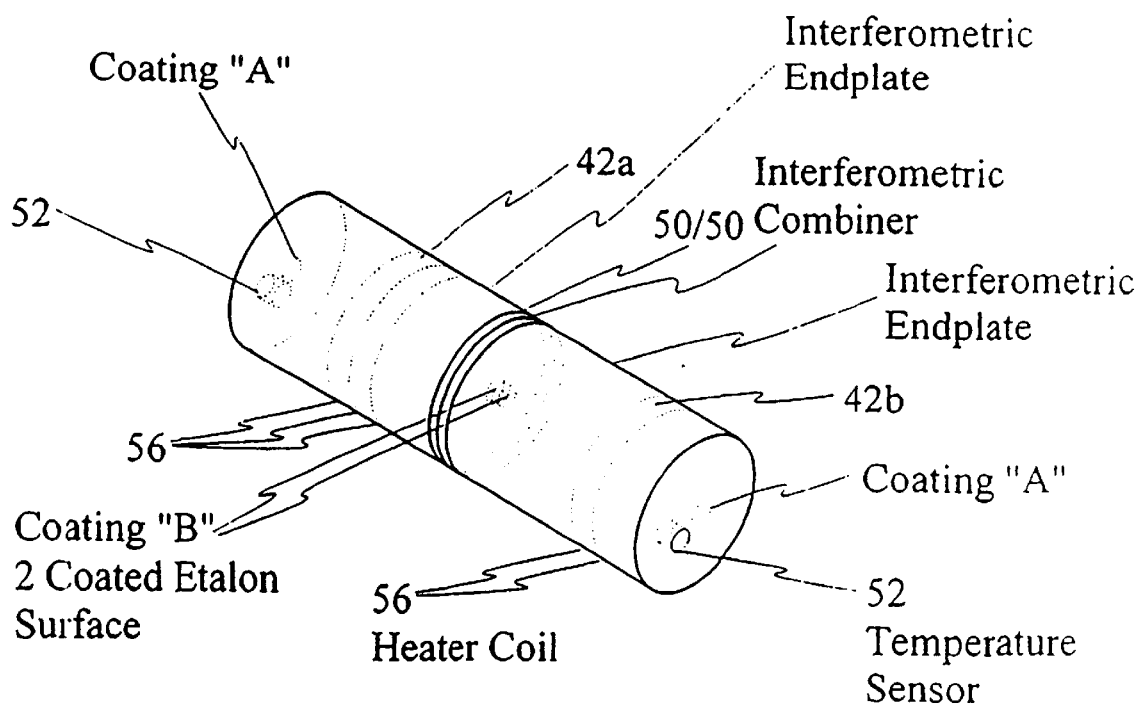
FIG. 5 is a detailed block diagram depicting a preferred embodiment similar to the one shown in FIGS. 4a to 4c.

Turning now to FIGS. 4a through 4c, an optical device is shown in accordance with the invention embodying a free-space device wherein unguided collimated light propagates within the device. The interleaver/de-interleaver shown has two glass interferometric end plates 42 having a spacer disposed therebetween. The spacer region between the two interferometric end plates 42 has a 50/50 coating (shown) except for where a dotted line is shown. This dotted line represents the region between the plates 42 where the etalon is formed (not shown in detail) of two at least partially reflecting surfaces having an air gap there between having a predetermined dimension of >5λ defining the free spectral range of the etalon. Graded index (GRIN) lenses 40a, through 40c in FIGS. 4a and 4b serve to provide collimated light through and between the end plates 42, and serve as focusing lenses at output ports. Mirrors 41a and 41b, are disposed at ends of the plates 42 to direct the beam toward a particular port. For example, light launched into an input port at lens 40a is directed at the etalon between the plates. About 50% of the light is transmitted through the front end of the etalon and follows a path wherein the light is incident upon the mirror 41a and it is subsequently directed to the lens 40b; the remaining light is transmitted through the back side of the etalon and impinges upon the mirror 41b where it is subsequently directed to the port at lens 40c. As shown, when channels having centre wavelengths λ1, λ2, λ3, λ4, . . . . λn are launched into the port at lens 40a, the channels are de-interleaved at the ports at lenses 40b and 40c into channel groups λ1,λ3,λ5 and λ2, λ4, λ6, . . . respectively; thereby providing two de-interleaved groups. FIG. 4b illustrates how the same circuit of FIG. 4a can be used backwards to interleave de-interleaved channels. Furthermore, FIG. 4c illustrates that an extra input port at GRIN lens 40d can be added and the circuit can be used to switch input channels to either output port by appropriately adjusting and controlling the phase. Referring now to FIG. 5, an optical device is shown in accordance with the invention embodying a free-space device wherein unguided collimated light propagates within the device. The interleaver/de-interleaver shown has two glass interferometric end plates 42 having a spacer disposed therebetween. The end plates and the spacer are joined by optical contacting. These contacting surfaces are polished simultaneously and in the same orientation in order to keep their surfaces parallel within 10 arc seconds when assembled. The axis of the through hole of the interferometric combiner and the axis of the coating B on each of the interferometric end plates are concentric within 0.1 mm. The interferometric combiner is conveniently embodied by a 50/50 coating. The etalon is absent this coating. The collimating/focusing GRIN lenses shown in FIG. 4 are not shown in FIG. 5, for clarity. Temperature sensors 52 are shown at ends of the plates 42 to determine the relative temperature difference between the two interferometric end plates 42. Heaters 56 which are conveniently wrapped around the end plates 42 are used with the temperature sensors 52 to control the phase relationship between the transmitted and reflected optical signals passing through opposite ends of the etalon.

Figure 6A:
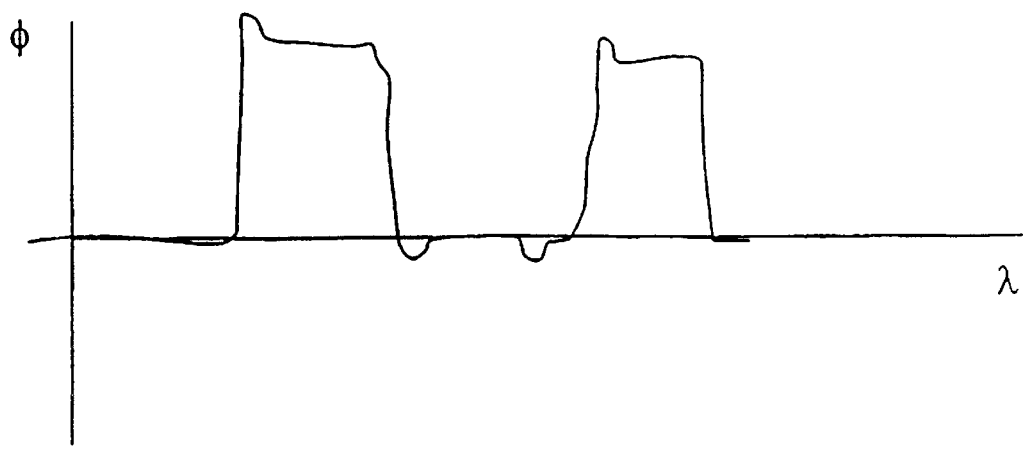
FIG. 6a is a graph of an output response of phase versus wavelength for a multi-cavity etalon shown in FIG. 6c.
Figure 6B:
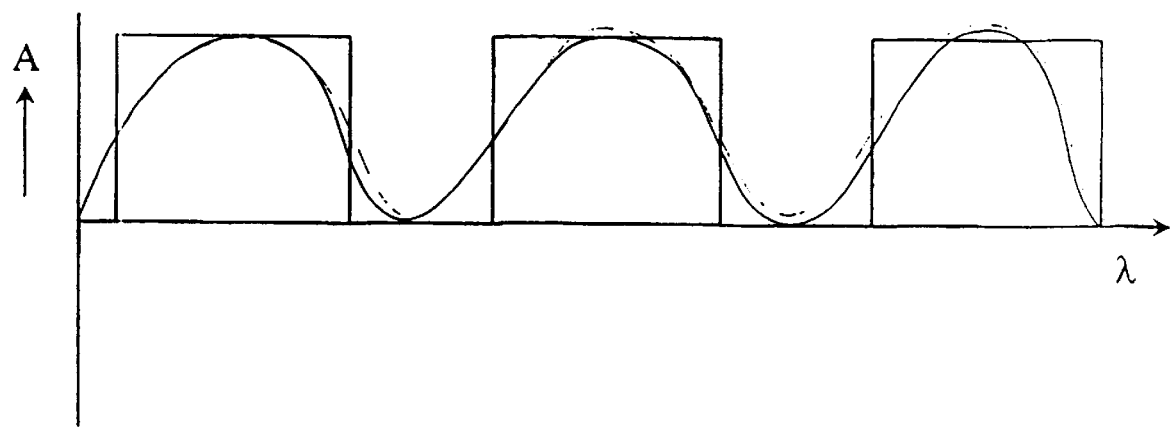
FIG. 6b is a graph depicting the output response of a single cavity etalon and of a multiple cavity etalon.
Figure 6C:
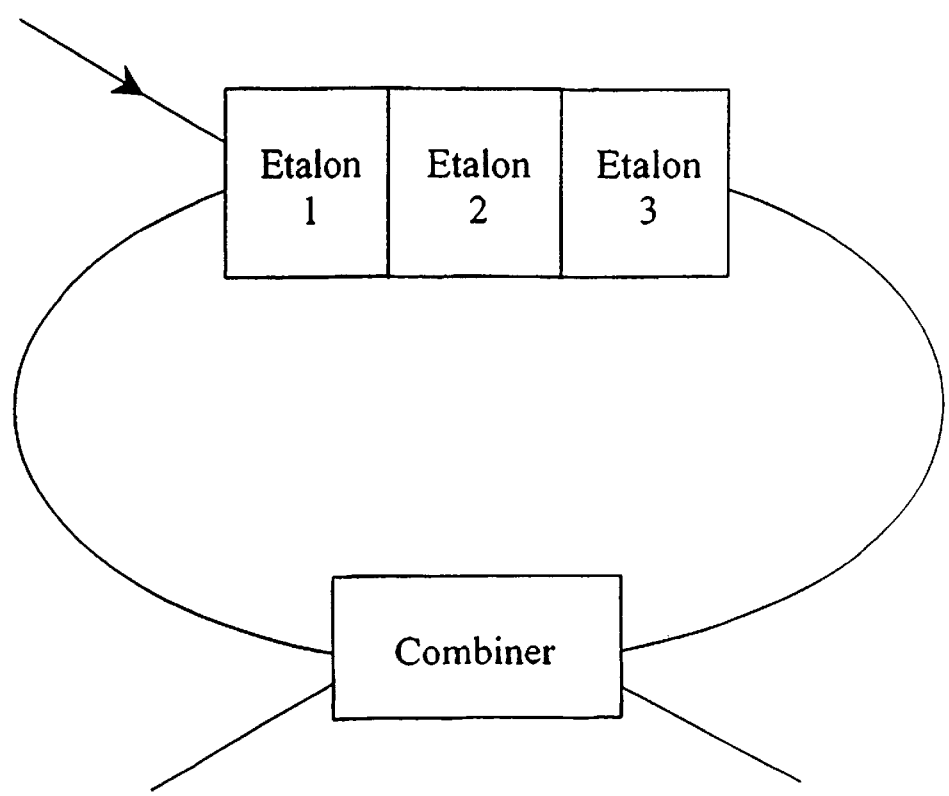
FIG. 6c is a circuit diagram of an alternative embodiment of the invention wherein a multi-cavity etalon is used.

Another embodiment of the invention is shown in FIG. 6, where an odd-integer number multi-cavity etalon is shown used in a same manner as was the single etalon described heretofore. Thus light is captured and combined from outermost opposite ports of the multi-cavity etalon structure in accordance with the teaching of this invention. By using multi-cavities, i.e. three etalons, the profile shown in FIG. 6a is acquired wherein there is an increase in the phase at certain portions 62 of the graph which result in a steeper sharper output response. Furthermore, by providing more etalon surfaces, i.e. at least four reflective surfaces in the instance of a three cavity etalon, more control is afforded by being able to change the reflectivites of each surface. FIG. 6b illustrates two plots, one in dotted outline, which represents a portion of an output spectrum for a single cavity etalon and a solid line which represents the same portion of the output spectrum for a three cavity etalon device, in accordance with the invention. FIG. 6c illustrates the circuit in accordance with this invention having a multi-cavity etalon coupled to a combiner.

Figure 7:
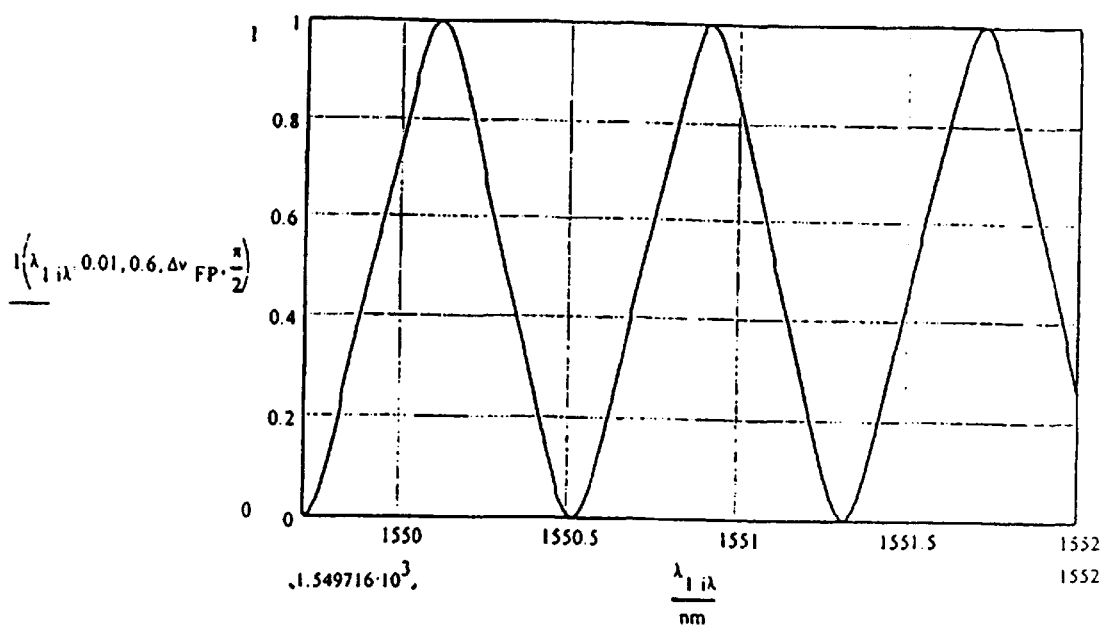
FIG. 7 is a graph depicting a linearized intensity output response of an alternative embodiment of the invention.

In previous embodiments of the invention the phase shifter has ensured an effective phase difference of π/2, so that the phase shift incurred through the 50/50 splitter has been compensated. This, then, has allowed complete constructive and destructive interference to occur in the interferometer outputs. However, if a different phase difference is used, then with a certain combination of reflectivities for the two facets of the etalon, a linearized intensity variation with wavelength as shown in the graph of FIG. 7 can be achieved. In this example, the reflection coefficients are 0.01 and 0.6 and the phase difference is 0.

Figure 8:
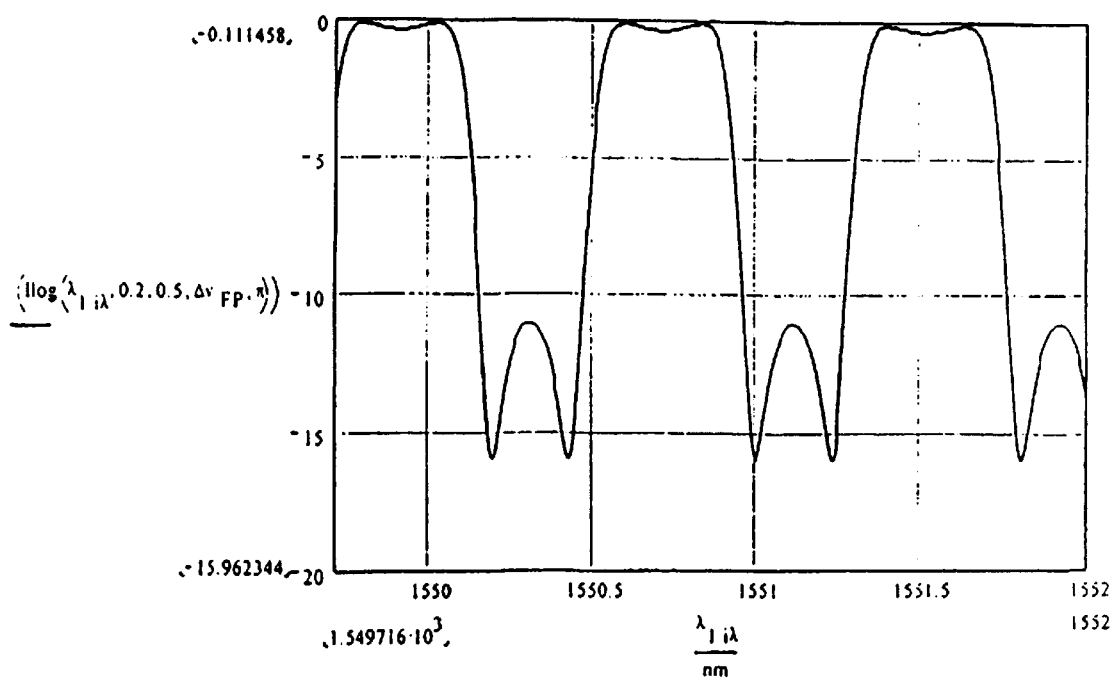
FIG. 8 is a graph depicting a an output response of an alternative embodiment of the invention where the reflectivities and phase are selected such that a band pass filter is provided.

FIG. 8 illustrates and alternative embodiment whereby a flat filter pass band is provided by using the correct phase difference and reflectivities.

Figure 9:
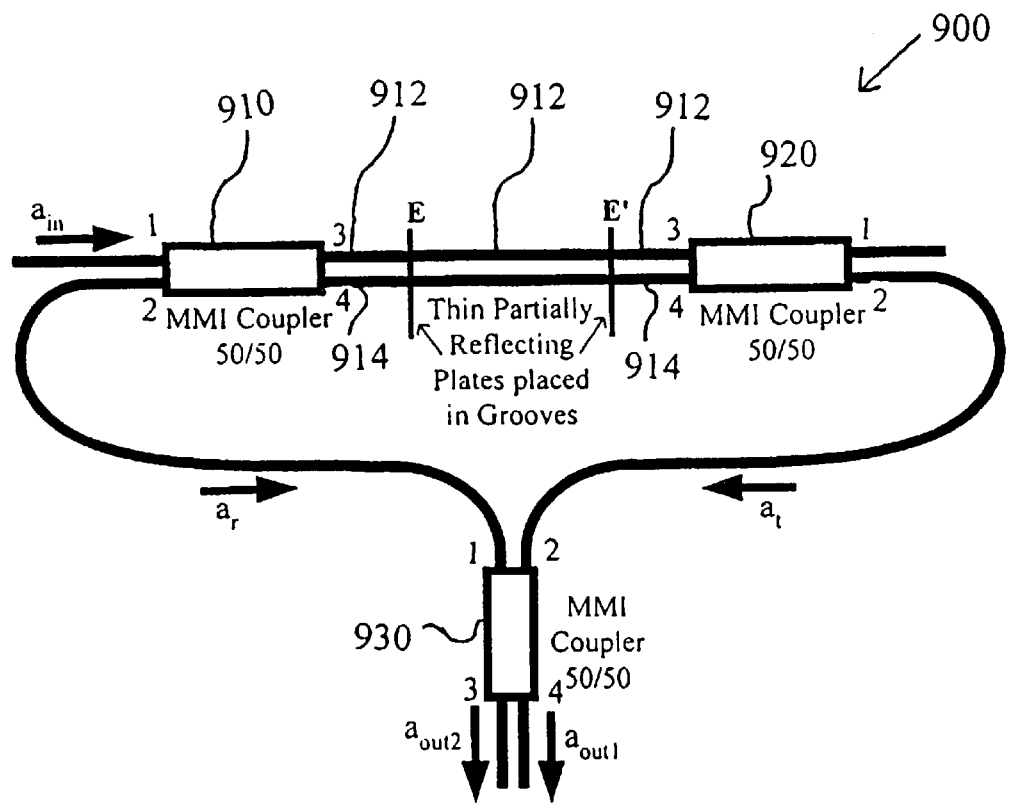
FIG. 9 is a circuit diagram of an alternative embodiment of the invention wherein planar waveguide technology is utilized.

Turning now to FIG. 9 an alternative embodiment of the invention is provided which functionally similar to the embodiment shown in FIG. 2. An interleaver circuit 900 is shown that can be conveniently made using planar waveguide technology. Here the waveguides can, for example, be disposed in glass. The waveguide regions can be doped, ion implanted, or grafted. For example the core light guide regions can be a light transmissive polymer. A first MMI 50/50 coupler 910 having an input port 1 and an output port 2 at a first end is optically coupled to a second, same MMI 50/50 coupler 920 by way of waveguides 912 and 914 disposed therebetween. Two thin partially reflecting plates E and E' are disposed in grooves cut into the waveguides 912 and 914. Plate E, waveguide 912 disposed therebetween, and Plate E' form a first Fabry-Perôt etalon. Similarly, plate E, waveguide 914 disposed therebetween, and Plate E' form a second Fabry-Perôt etalon. An output port 2 of the first MMI coupler 910 and an output port 2 of the second MMI coupler 920 are coupled to input ports 1 and 2 of a third MMI 50/50 coupler 930 having output ports 3 and 4 for carrying signals $a_{out1}$ and $a_{out2}$ respectively.

Figure 10:
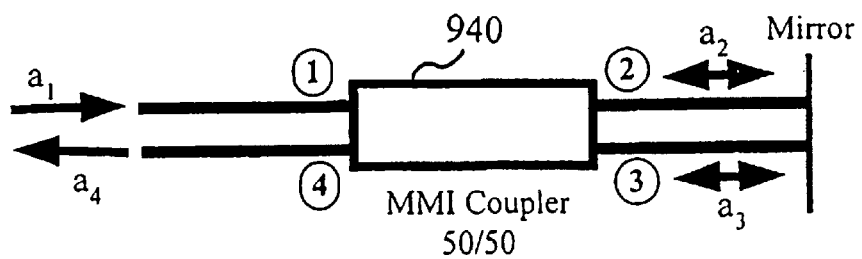
FIG. 10 is a more detailed schematic diagram of an MMI coupler used in the circuit of FIG. 9 wherein the operation is of the coupler is described in accordance with this figure.

Prior to describing the operation of the interleaver/de-interleaver circuit 900 FIG. 10 is used as a means of describing the functionality of a four-port 3 dB coupler, similar to the ones shown in FIG. 9. An input signal $a_1$, provided to port 1 of the coupler 940 is divided equally between ports 2 and 3. After the signals are reflected backwards by the mirror, shown, they are combined into port 4 of the coupler not port 1. In this manner, the reflected signal is separated from the input signal without the requirement of an optical circulator. Of course the MMI couplers shown in FIG. 9 could be replaced with 3 dB couplers.

The operation of the circuit of FIG. 9 is similar to the operation of the de-interleaver/interleaver shown in FIG. 2. In FIG. 9 an input signal $a_{in}$ is launched into port 1 and is divided equally into two de-interleaved signals on waveguides 912 and 914 at ports 3 and 4 respectively of the coupler 910. The transmission signal at and reflection signal $a_r$ transmitted through and reflected from the etalon between the couplers 910 and 920 are input into port 1 and 2 of the MMI coupler 930 and are provided as two de-interleaved output signals. Of course, each de-interleaved output stream can be provided to yet another similar de-interleaving circuit for further de-interleaving the channelized signals. For example, at a first stage such as the one described in reference to FIG. 9, channels 1, 3, 5, 7, . . . are output on $a_{out1}$ and channels 2, 4, 6, 8, . . . are output on $a_{out2}$. Notwithstanding, channels 1, 3, 5, 7, 9, can be fed to a similar circuit to circuit 900 wherein the etalon has a greater FSR so that two other data streams 1, 5, 9 and, 3, 7, 11 can further be demultiplexed.

Figure 11:
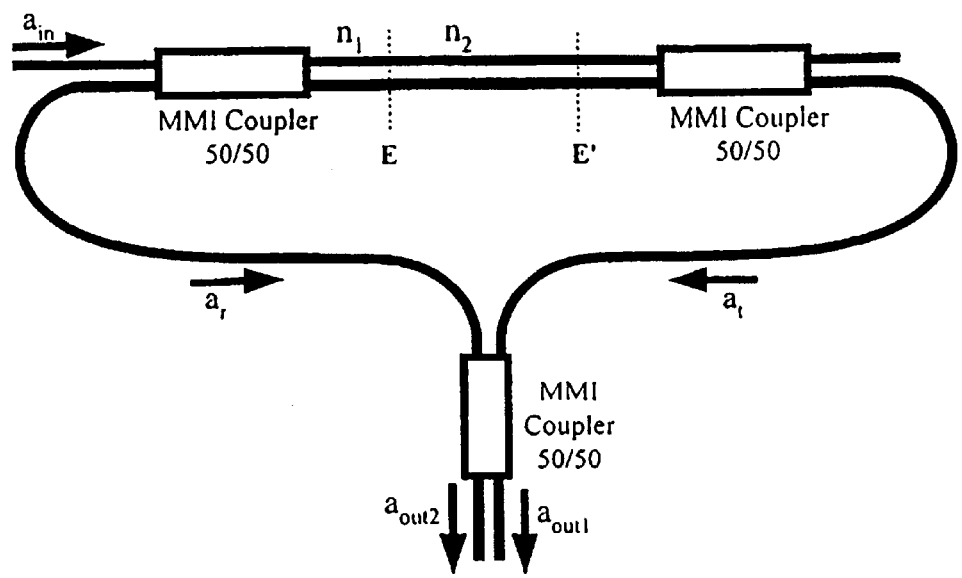
FIG. 11 is a circuit diagram of an alternative embodiment of the invention to that shown in FIG. 9, wherein two etalons are created by providing regions within the planar waveguide having a different refractive index than in an adjacent region.

Another similar embodiment to that of FIG. 9 is shown in FIG. 11 wherein an etalon 111 is formed between the two MMI couplers 910 and 920 by way of providing a region in each waveguide 912 and 914 wherein the refractive index is different from the refractive index of the waveguides coupled to and adjacent to this region. The etalon region can be a polymer having a suitable refractive index. Of course the length of the etalon, and refractive index difference between the etalon region and adjacent regions must be sufficient such as to provide a desired reflectivity at the interface between different index regions.

Figure 12:
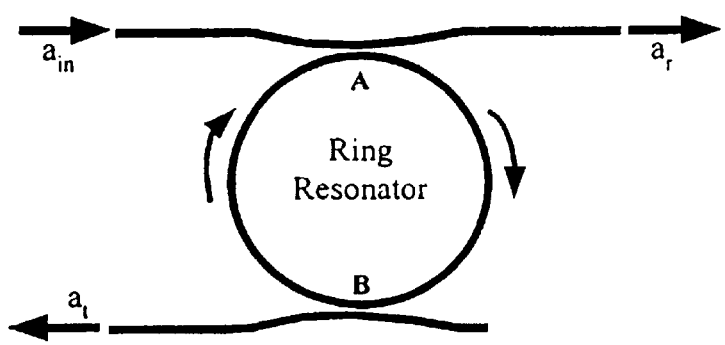
FIG. 12 is a block circuit diagram of ring resonator used and is a functional equivalent to the Fabry-Perôt resonator shown in previous embodiments.

FIG. 12 depicts a functionally similar embodiment to a Fabry-Perôt etalon. The circuit shown in FIG. 12 utilizes a ring resonator. An equivalent transfer function of a Fabry-Perôt resonator can be obtained by combining a waveguide ring resonator and two directional couplers as is shown. This is a 3-port device with one input port and two output ports. The signals $a_r$ and $a_t$ at the output ports of the device are equivalent to the reflected and transmitted signals of a Fabry-Perôt resonator. The coupling coefficients of the directional couplers control the finesse of the cavity. The periodic spectral response is determined by the total length of the ring through the following equation:

$$FSR = c/\Delta L$$

where c is the speed of light and $\Delta L$ is the optical length through the ring.

Figure 13:
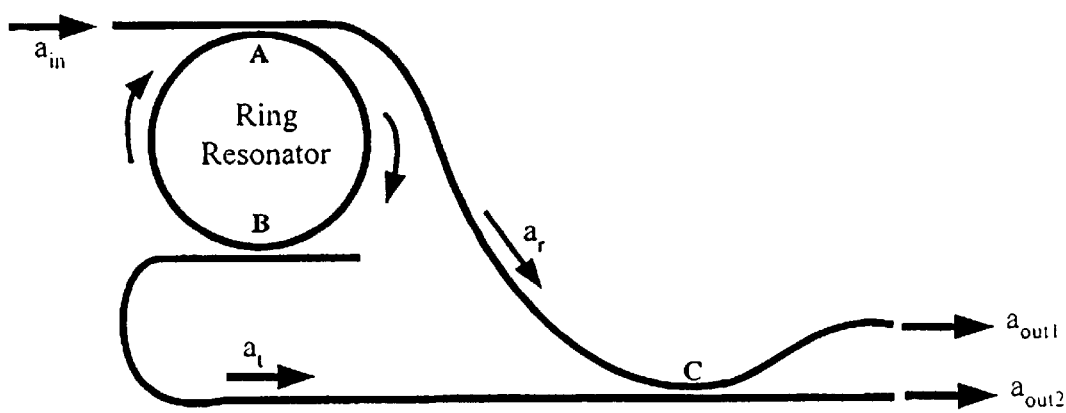
FIG. 13 is a block circuit diagram of yet an alternative embodiment of the invention wherein ring resonator is utilized.

An embodiment in accordance with this invention is shown in FIG. 13. The two outputs of the ring resonator are routed to a 3 dB coupler to obtain two interleaved signals, $a_{out1}$ and $a_{out2}$. An interleaving function can be realized if the optical length AC is equal to the optical length BC, wherein the optical length is the physical length x the refractive index. Of course the physical length is somewhat restricted by the amount of bending that can be tolerated. In a preferred embodiment, for interleaving, the coupler is a 50/50 coupler. The coupler at C can be a directional coupler or an MMI coupler. In a preferred embodiment the couplers at A and B are 17.1%/82:9% couplers, such that 82.9% of the light is coupled into the ring, and 17.1% of the light passes through the waveguides adjacent the ring.

Figure 14:
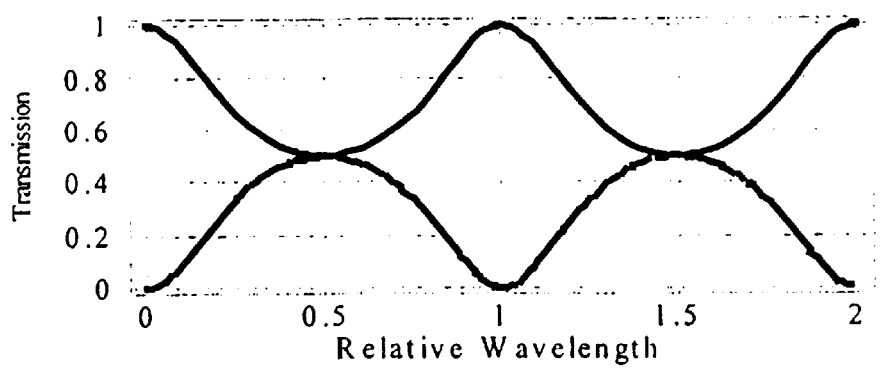
FIG. 14 is a graph of transmission versus relative wavelength showing spectral amplitude response of the two outputs $a_r$ and at of the ring resonator.
Figure 15:
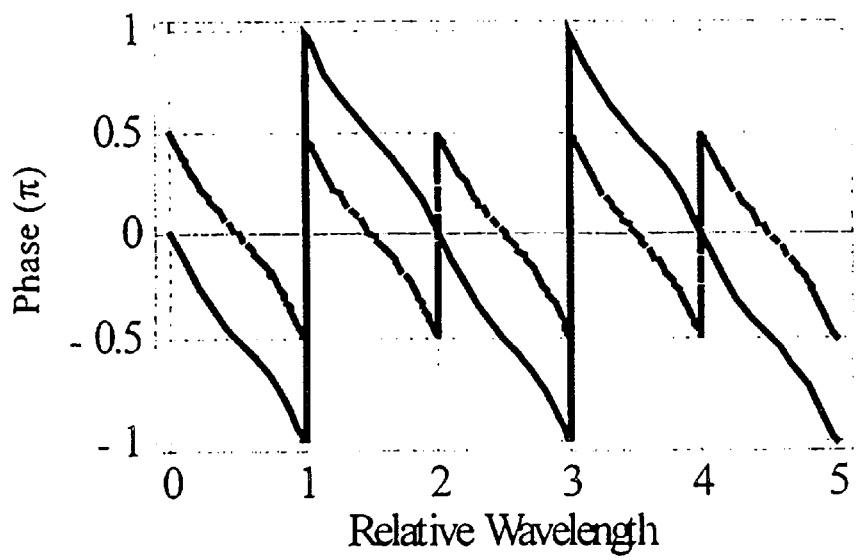
FIG. 15 is a graph of the spectral phase response of the two outputs of the ring resonator respectively.
Figure 16:
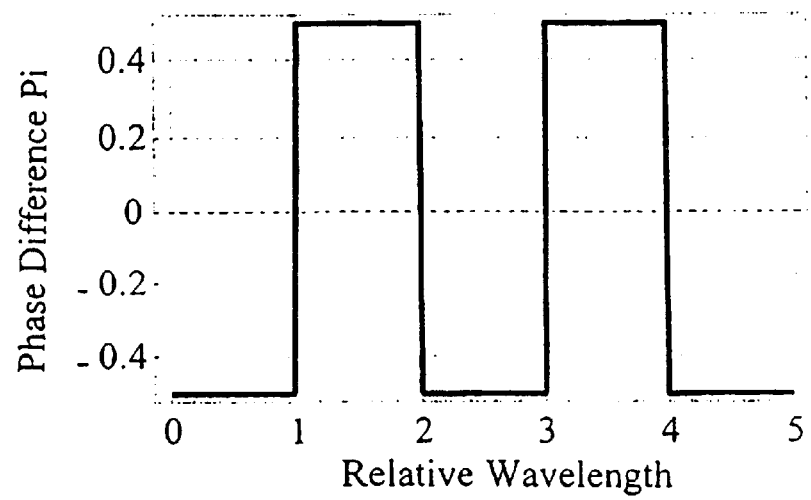
FIG. 16 is a graph of phase difference versus relative wavelength between the two outputs $a_r$ and $a_t$ of the ring resonator showing the phase difference alternating between $-\lambda/2$ and $+\lambda/2$ over consecutive wavelength channels equivalent fo the FSR of the ring resonator.
Figure 17:
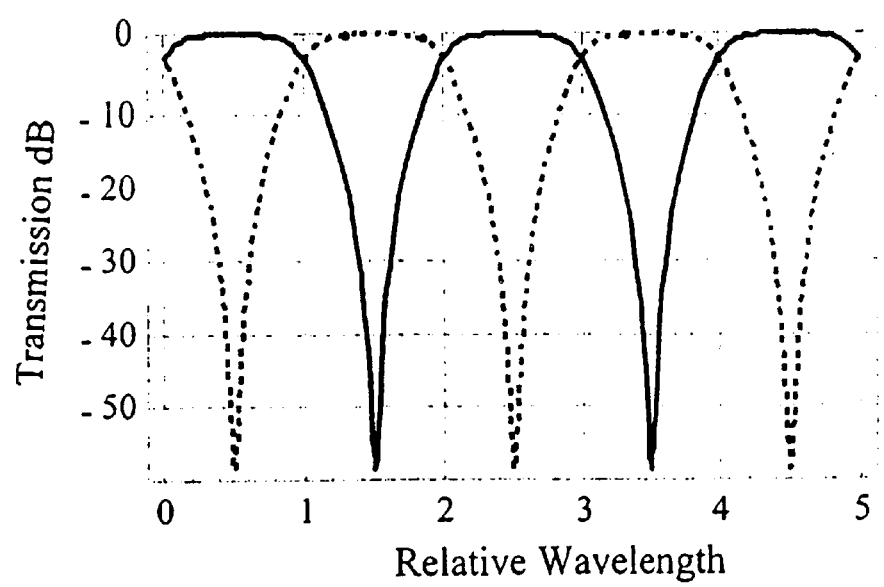
FIG. 17 is a graph of transmission versus relative wavelength depicting the spectral transmissions of the two interleaved signals $a_{out1}$ and $a_{out2}$ at respective outputs of the coupler interferometer.

FIGS. 14 and 15 show the spectral amplitude and the phase responses of the two outputs, $a_r$ and $a_t$, of the ring resonator. FIG. 16 shows the phase difference between the two outputs, $a_r$ and $a_t$, of the ring resonator. The phase difference alternates between $\pi/2$ and $+\pi/2$ over consecutive wavelength channels equivalent to the FSR of the ring resonator. Finally, FIG. 17 shows the spectral transmissions of the two de-interleaved signals, a and $a_{out2}$, at the outputs of the waveguide coupler interferometer Of course numerous other embodiments may be envisaged, without departing from the spirit and scope of the invention. For example, the etalon or multi-cavity etalon can be a tunable etalon.

Figure 18:
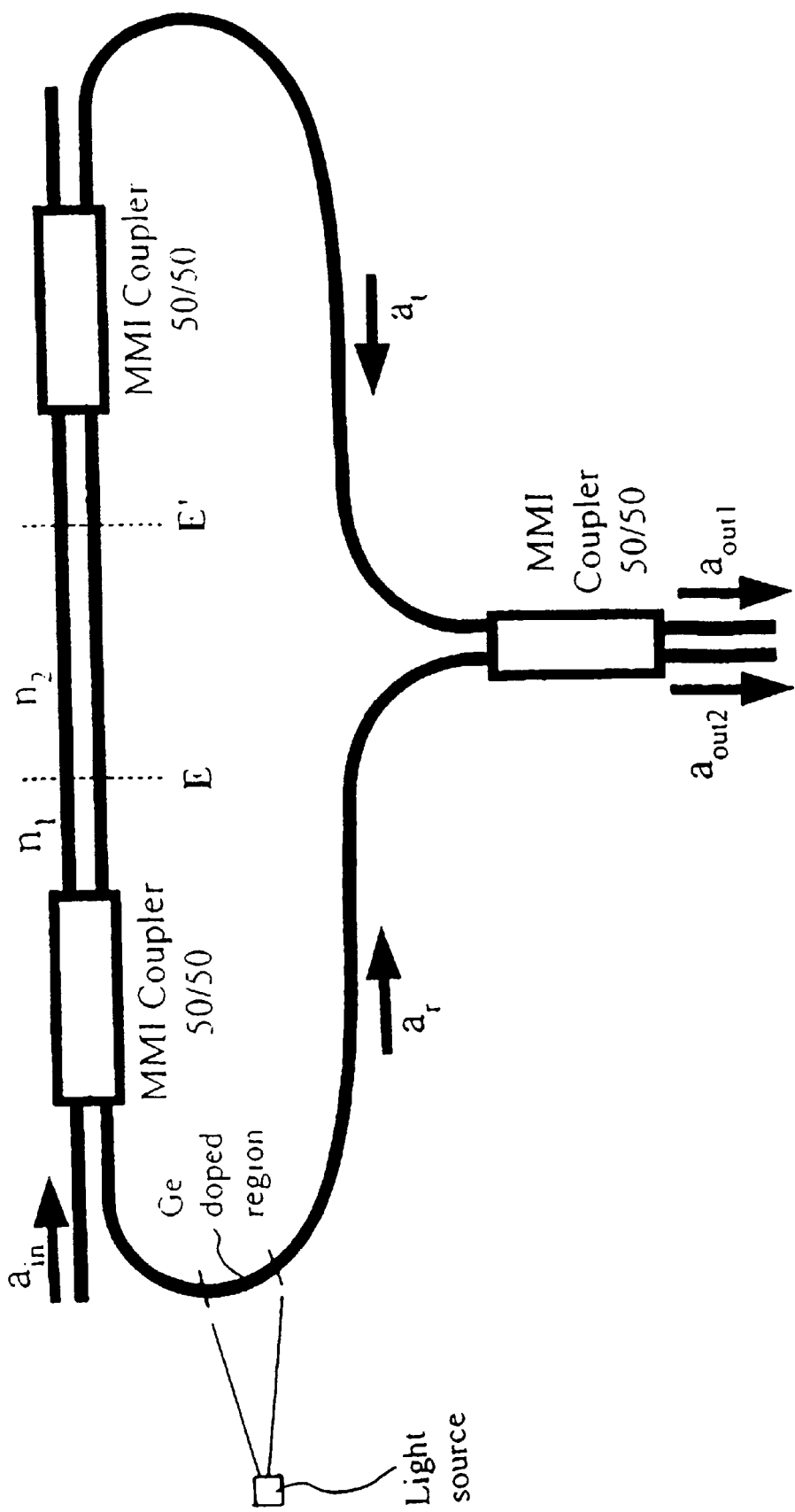
FIG. 18 is a circuit diagram of the basic circuit shown in FIG. 11 wherein a region of the waveguide between the first coupler and the third coupler is doped to become more light sensitive to effect a controlled refractive index change by being irradiated by a light source.

Furthermore, the monolithic waveguide devices described in accordance with this invention, more particularly the embodiments shown in FIGS. 9, 11, and 13 can be fabricated in such a way as to make them relatively temperature stable by permanently tuning the device. In any of these embodiments one of the arms, $a_r$ or $a_t$ can be doped, for example with germanium and subsequently exposed to UV light, in order to vary the refractive index of a particular section of the doped arm. Alternatively, exposing one arm to light of a suitable intensity and duration can in some instances yield a required refractive index change to permanently tune the device. This is a convenient method shown in FIG. 18 of permanently adjusting the phase relationship between the two arms $a_r$ and $a_t$ thereby yielding very temperature tolerant devices.

Figure 19:
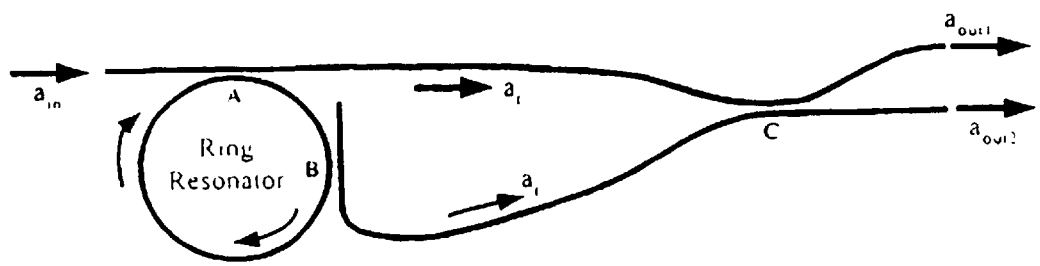
FIG. 19 is a circuit diagram of a circuit shown in accordance with an embodiment of the invention for providing a de-interleaver/interleaver function.
Figure 20A:
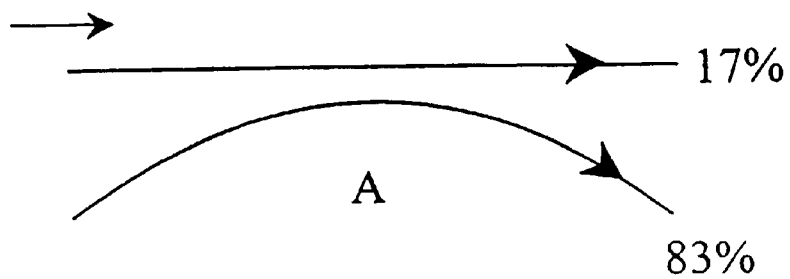
FIG. 20a is a circuit diagram of a portion of the circuit shown in FIG. 19; and, FIGS. 20b and 20c are circuit diagrams of portion of the circuit shown in FIG. 19.
Figure 20B:
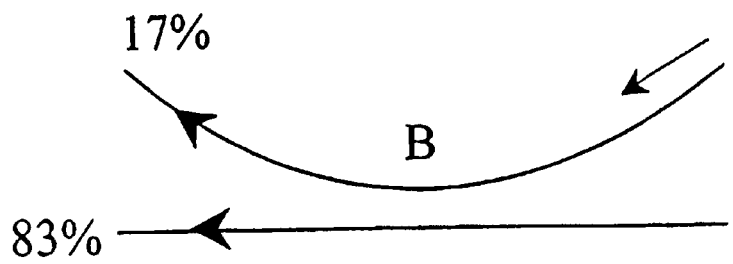
Figure 20C:
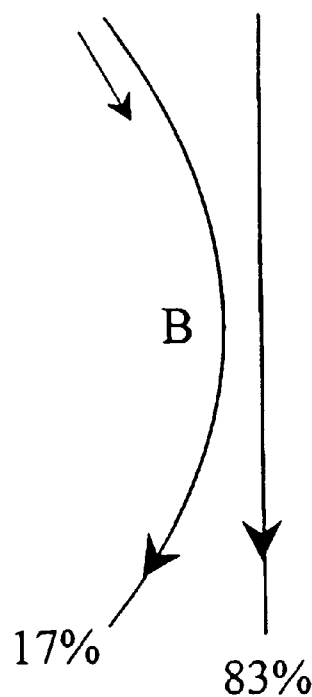

An alternative embodiment of the invention is shown in FIG. 19 wherein a de-interleaver/interleaver is shown. In this instance the locations A and B are shown to be 90 degrees apart. The relationship between the locations A, B, and C are as follows: $AB+BC-AC=L_{ring}/2$, where $L_{ring}$ is the length of the ring resonator. FIGS. 20a, 20b, and 20c illustrate approximate power coupling ratios in couplers A, B, and C.

What is claimed is:

1. A filtering device comprising:
    a first port for inputting an input beam of light;
    a beam splitter for dividing the input beam of light into two input sub-beams;
    resonator means for dividing the two input sub-beams into two transmitted sub-beams and two reflected sub-beams;
    a first coupler for combining the two reflected sub-beams into a reflected beam of light;
    a second port for outputting the reflected beam;
    a second coupler for combining the two transmitted sub-beams into a transmitted beam of light;
    a third port for outputting the transmitted beam;
    combining means optically coupled with the second and third ports for combining the transmitted and reflected light beams so that they interfere to provide one or more output beams of light; and
    a fourth port for outputting at least one of the output beams of light.

2. The filtering device as defined in claim 1, wherein the resonator means comprises a first resonant cavity means for receiving one of the input sub-beams of light, and second resonant cavity means for receiving the other of the input sub-beams of light.

3. The filtering device as defined in claim 2, wherein each of the first and the second resonant cavity means comprises an etalon having first and second partially transmissive reflectors.

4. The filtering device as defined in claim 3, wherein the etalons have substantially the same free spectral range.

5. The filtering device as defined in claim 3, wherein at least one of the etalons is comprised of a waveguide-like region having a refractive index different than a refractive index of adjacent contiguous regions, the interface between the adjacent different refractive index regions defining reflective end faces of the etalon.

6. The filtering device as defined in claim 3, wherein at least one of the etalons is comprised of a waveguide length having a reflective plate disposed at each end.

7. The filtering device as defined in claim 6, wherein the at least one etalon is comprised of a length of waveguide having a mode field similar to a mode field of waveguides optically coupling the etalon to the first and second couplers.

8. The filtering device as defined in claim 1, wherein a first optical waveguide having a predetermined length couples the combining means with the first coupler; and wherein a second optical waveguide having a predetermined length couples the combining means with the second coupler.

9. A method of phase tuning the filtering device as defined in claim 8, comprising the step of irradiating one of the first and second optical waveguides with light of a suitable intensity, wavelength and duration to effect a suitable refractive index change in said waveguide.

10. The method of tuning as defined in claim 9, wherein said waveguide that is irradiated is first doped with a material that will effect a permanent refractive index change in the presence of light of a suitable intensity, wavelength and duration.

11. A method of tuning the filtering device as defined in claim 8, comprising the step of providing a suitable refractive index change over a length of one of the first and second waveguides so as to effect a required amount of tuning.

12. The filtering device as defined in claim 8, wherein the first and second couplers and the first and second optical waveguides are substantially disposed within a planar monolithic substrate.

13. The filtering device as defined in claim 1, further comprising phase shifter means disposed between one of the second and third ports and the combining means for varying the phase relationship between the reflected beam and the transmitted beam to provide a desired interference.

14. The filtering device as defined in claim 1, wherein each of the first and second couplers is selected from the group consisting of a multi-mode interference (MMI) device and a 50/50 coupler.

15. The filtering device as defined in claim 1, wherein the beam splitter and the first coupler comprises a single MMI or 50/50 coupler.

16. The filtering device as defined in claim 1, further comprising a fifth port for outputting another output beam; wherein the device is an interleaver/deinterleaver circuit; whereby a first set of channels is input or output through the fourth port, a second group of channels is input or output through the fifth port, and a combined group of the first and second groups of channels is output or input through the first port.

17. The filtering device as defined in claim 1, wherein the combining means is an optical coupler selected from the group consisting of a multi-mode interference (MMI) device and a 50/50 coupler.

* * * * *